(12) United States Patent
Ishikawa

(10) Patent No.: US 9,131,131 B2
(45) Date of Patent: Sep. 8, 2015

(54) ELECTRONIC DEVICE HAVING A MAIN BODY AND A MOVEABLE UNIT CONNECTED TO THE MAIN BODY

(75) Inventor: Koji Ishikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 539 days.

(21) Appl. No.: 13/286,928

(22) Filed: Nov. 1, 2011

(65) Prior Publication Data

US 2012/0113308 A1   May 10, 2012

(30) Foreign Application Priority Data

Nov. 10, 2010  (JP) .................................. 2010-251897

(51) Int. Cl.
*H04N 5/225*   (2006.01)

(52) U.S. Cl.
CPC ................... *H04N 5/2251* (2013.01)

(58) Field of Classification Search
CPC .... G03B 17/56; G03B 17/561; G03B 17/563; G03B 17/565; G03B 17/566; G03B 17/568; G03B 2217/002; G03B 17/02; G03B 17/48; G03B 29/00; G03B 2217/00; H04N 5/2257; H04N 5/2253; H04N 5/2254; H04N 5/2258; H04N 5/2259; H04N 5/2251; H04N 5/2252; H04N 21/4223; G02B 13/001; G06F 1/1686; G06K 9/209; A61B 1/04–1/055; G06T 1/0014; A63F 2009/2435; A63F 13/213; H05K 5/00
USPC .................... 348/333.06, 373, 374, 375, 376; 455/575.3, 556.1
See application file for complete search history.

(56) References Cited

U.S. PATENT DOCUMENTS

| | | | |
|---|---|---|---|
| 5,739,859 A * | 4/1998 | Hattori et al. ................. 348/375 |
| 7,288,934 B1 * | 10/2007 | Ikarashi et al. .......... 324/207.21 |
| 7,440,003 B2 * | 10/2008 | Shimamura et al. ....... 348/14.02 |
| 7,443,404 B2 * | 10/2008 | Kawamoto et al. .......... 345/660 |
| 8,416,333 B2 * | 4/2013 | Nakai et al. .............. 348/333.06 |
| 2005/0083351 A1 * | 4/2005 | Kawamoto et al. .......... 345/660 |
| 2005/0248678 A1 * | 11/2005 | Kawai et al. ............. 348/333.06 |
| 2006/0148540 A1 * | 7/2006 | Satoh et al. ................ 455/575.3 |
| 2007/0157428 A1 * | 7/2007 | Kim .............................. 16/221 |
| 2007/0298850 A1 * | 12/2007 | Miyata et al. .............. 455/575.3 |
| 2008/0256751 A1 * | 10/2008 | Hirose ........................... 16/366 |
| 2009/0295975 A1 * | 12/2009 | Takahashi et al. ....... 348/333.01 |
| 2010/0144405 A1 * | 6/2010 | Hakamata et al. ......... 455/575.3 |
| 2012/0045196 A1 * | 2/2012 | Takahashi et al. ............ 396/374 |
| 2012/0081593 A1 * | 4/2012 | Nakagawa et al. ...... 348/333.06 |
| 2013/0050557 A1 * | 2/2013 | Moriyasu ................. 348/333.06 |
| 2013/0113466 A1 * | 5/2013 | Hirayama .................. 324/207.2 |

FOREIGN PATENT DOCUMENTS

| | | |
|---|---|---|
| JP | 2003-60942 A | 2/2003 |
| JP | 2006-038777 A | 2/2006 |
| JP | 2009-272930 A | 11/2009 |

* cited by examiner

*Primary Examiner* — Aung S Moe
(74) *Attorney, Agent, or Firm* — Canon U.S.A., Inc. IP Division (57) ABSTRACT

If a movable unit connected to a main body and is rotatable around a first axis as a rotation center with respect to the main body in which a magnetic field generating member is provided is rotated around the first axis with respect to the main body, a magnetic field detection sensor arranged near the first axis rotates and a direction of a magnetic field that can be detected by the magnetic field detection sensor changes.

14 Claims, 9 Drawing Sheets

DETECTION RESULT OF
ROTATION DETECTION
MAGNETIC SENSOR
⇒ LOW

DETECTION RESULT OF
OPENING/CLOSING
DETECTION MAGNETIC SENSOR
⇒ HIGH

| | OUTPUT VOLTAGE LEVEL OF OPENING/CLOSING DETECTION MAGNETIC SENSOR | OUTPUT VOLTAGE LEVEL OF ROTATION DETECTION MAGNETIC SENSOR |
|---|---|---|
| NORMAL IMAGING STATE | LOW | HIGH |
| CONTAINING STATE | LOW | LOW |
| VARIABLE-ANGLE STATE | HIGH | LOW |
| SELF IMAGING STATE | HIGH | HIGH |

ELECTRONIC DEVICE HAVING A MAIN BODY AND A MOVEABLE UNIT CONNECTED TO THE MAIN BODY

BACKGROUND OF THE INVENTION

1. Field of the Invention

The present invention relates to an electronic device having a movable unit capable of rotating with respect to a main body thereof.

2. Description of the Related Art

Electronic devices such as digital cameras and video cameras having an image display rotatably attached to the main body by a hinge mechanism, a so-called variable-angle image display, have been widely used.

For example, with an imaging apparatus having a variable-angle image display, the image display unit can be rotated to any angle while the image display is opened horizontally so that a subject can be captured while checking the subject at a high angle or low angle and even self imaging (self photographing) becomes possible by rotating the display.

Japanese Patent Application Laid-Open No. 2003-60942 discusses a digital camera including a display case with an image display, a main body case with an imaging unit, and a hinge connecting both cases. The hinge is connected to the main body case so that the display case can be rotated around a first rotation axis as a rotation center and around a second rotation axis as the rotation center with respect to the main body case.

The display case of a digital camera connected by such a hinge cannot display a proper image in the display unit unless the display mode of the image displayed in the display is modified according to a rotation state around the first rotation axis as the rotation center and the rotation state around the second rotation axis as the rotation center with respect to the main body case.

That is, there is a discussion regarding exercise control according to the state of a movable portion with respect to the main body of a device in an electronic device in which the main body of the device and the movable portion are rotatably connected.

SUMMARY OF THE INVENTION

An aspect of the present invention is an electronic device including a main body, a movable unit connected to the main body and able to rotate around a first axis as a rotation center with respect to the main body, a magnetic field generating member provided in the main body, and a magnetic field detection sensor arranged near the first axis, wherein if the movable unit is rotated around the first axis with respect to the main body, the magnetic field detection sensor rotates and a direction of a magnetic field that can be detected by the magnetic field detection sensor changes.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1A:
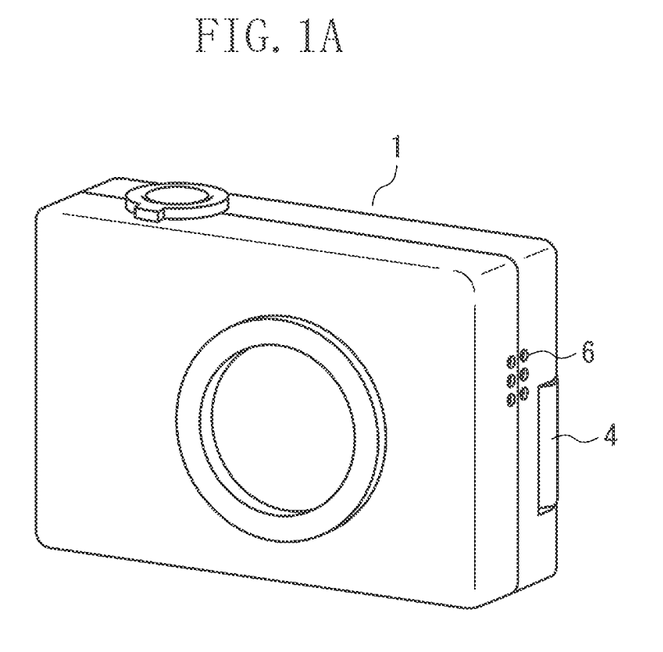
FIGS. 1A and 1B are external perspective views of an imaging apparatus according to an exemplary embodiment of the present invention.
Figure 1B:
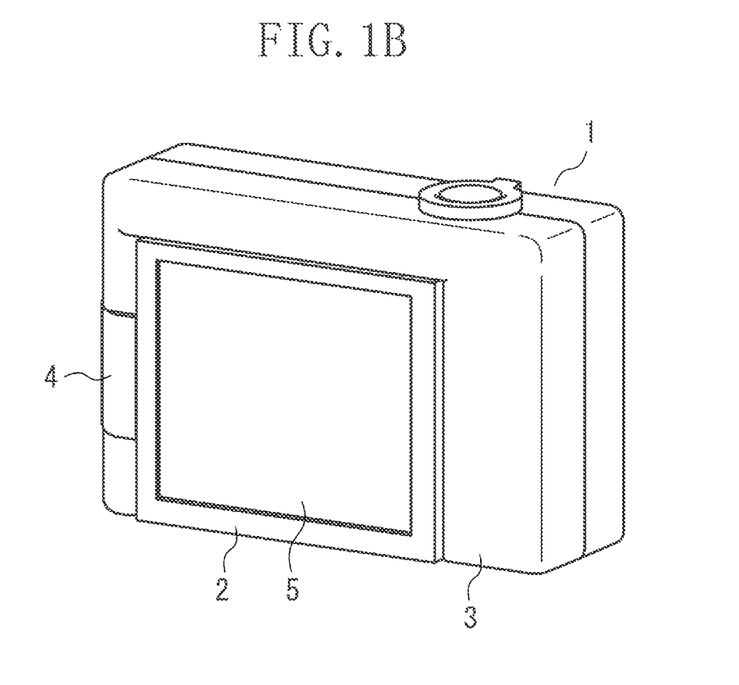

FIGS. 1A and 1B are external perspective views of a configuration example of an imaging apparatus (digital camera), and FIG. 1A is an external perspective view when viewed from a front side, and FIG. 1B is an external perspective view when viewed from a rear side.

A digital camera 1 includes a display case 2 having a display panel 5, a main body case 3 on a camera main body side, and a hinge 4 connecting the display case 2 and the main body case 3. The hinge 4 has a so-called biaxial hinge mechanism and connects the main body case 3 and the display case 2 in such a way that the display case 2 can rotate around the first rotation axis as the rotation center and around the second rotation axis as the rotation center with respect to the main body case 3.

In the present exemplary embodiment, the main body includes the main body case 3 and the hinge 4, and the display case 2 is a movable unit that can rotate with respect to the main body.

To distinguish the operation to rotate the display case 2 around the first rotation axis and the operation to rotate the display case 2 around the second rotation axis as the rotation center, the operation to rotate the display case 2 around the first rotation axis as the rotation center may be referred to as an opening/closing operation, and the operation to rotate the display case 2 around the second rotation axis may be referred to as a rotation operation.

Also, the angle in the rotation direction of the display case 2 around the first rotation axis as the rotation center with respect to the main body case 3 may be called an opening angle, and the angle in the rotation direction of the display case 2 around the second rotation axis as the rotation center with respect to the main body case 3 may be called a rotation angle. The opening/closing operation and the rotation operation may use one of the display case 2 and the main body case 3 as a reference, and it is enough for the display case 2 and the main body case 3 to relatively open/close and rotate.

With the main body case 3 and the display case 2 being connected by the hinge 4, a photographer can freely change the angle of the display case 2 with respect to the main body case 3 according to a posture of imaging and can image capture a subject at a high angle or low angle while viewing the subject. A speaker 19 is internally arranged near the hinge 4 on the side face on the side of the hinge 4 of the main body case 3, and sound holes 6 to guide sound of the speaker 19 to the outside are provided.

Figure 2A:
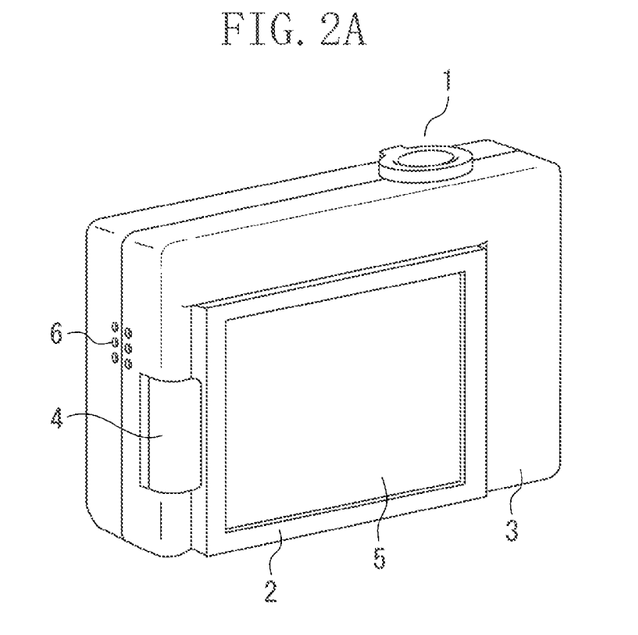
FIGS. 2A to 2D are diagrams each illustrating a transition of states of a display case of the imaging apparatus according to an exemplary embodiment of the present invention.

FIGS. 2A, 2B, 2C, and 2D are perspective views exemplifying the transition of states of the display case 2 in the digital camera 1. The main body case 3 of the digital camera 1 is provided with an containing portion 7 to contain the display case 2 when closed (opening angle: 0 degree), and FIG. 2A is a diagram illustrating a normal imaging state in which the display case 2 is closed to the side of the main body case 3 and contained in the containing portion 7 while the display surface of the display panel 5 is directed to the photographer (outside).

This state is suitable when the camera is used in the same way as a common digital camera having no display capable of opening/closing and rotating with respect to the main body case. In imaging, a subject image is displayed in the display panel 5.

Figure 2B:
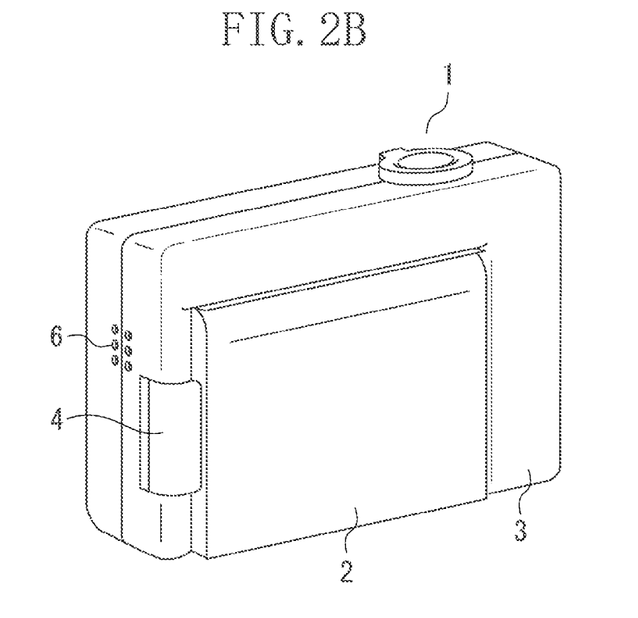

FIG. 2B is a diagram illustrating a containing state in which the display case 2 is closed to the side of the main body case 3 while the display surface of the display panel 5 is directed to the main body case 3 (inside). The display panel 5 is not exposed to the outside of the digital camera 1 in this state, and the display surface thereof is not damaged, which makes this state suitable when the display surface of the display panel 5 is to be protected when the camera is not used.

In this state, control is performed so that no image is displayed in the display panel 5 for saving power because there is no need to display an image in the display panel 5 even if the camera is turned on.

Figure 2C:
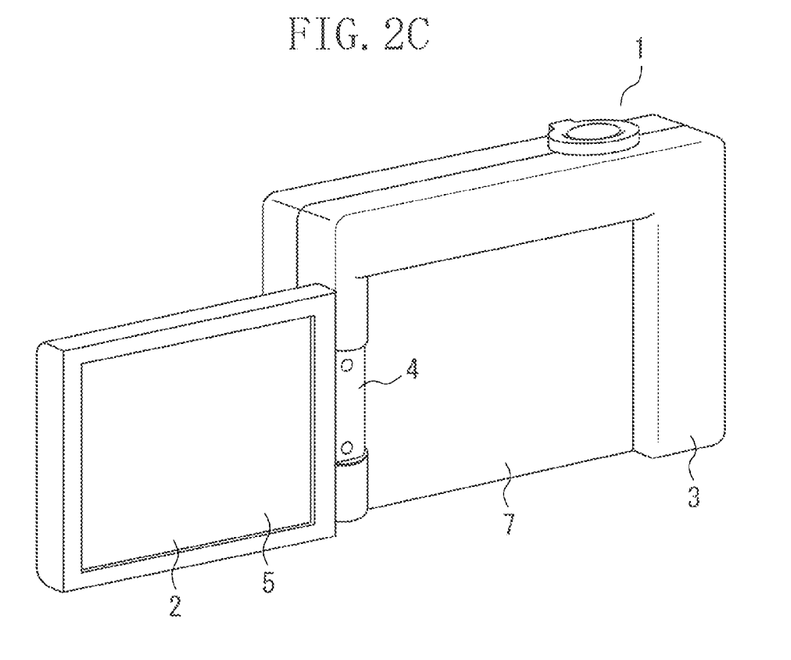

FIG. 2C is a diagram illustrating a state in which the display case 2 is opened with respect to the main body case 3 while the display surface of the display panel 5 is directed to the photographer, and this state is suitable for various situations because the photographer can freely change the angle of the display case 2 with respect to the main body case 3 according to a camera angle.

In this state, the display surface is directed to the photographer by being rotated by 180 degrees with respect to the normal imaging state, and thus, control is performed so that an image displayed on the display surface is displayed by being inverted up and down, and left and right with respect to the normal imaging state.

Figure 2D:
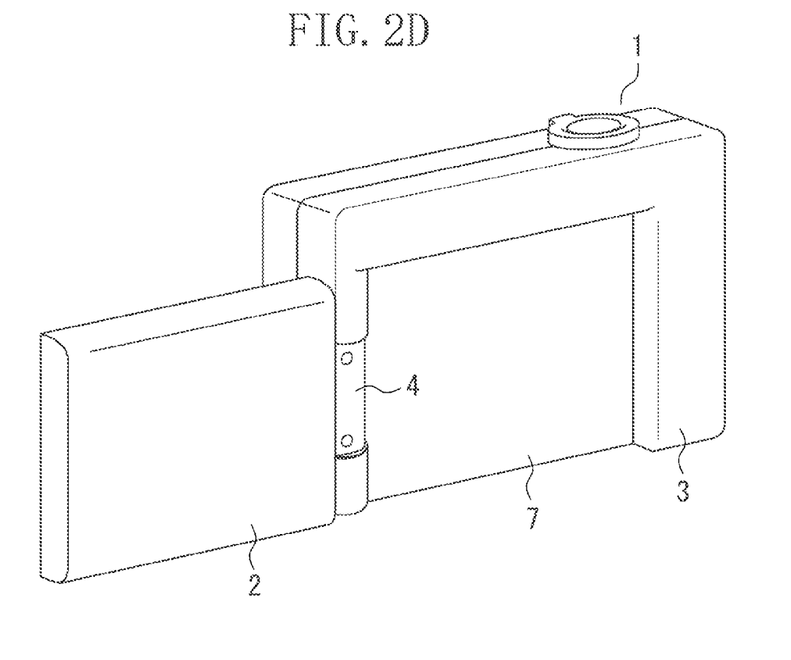

FIG. 2D is a diagram illustrating a state in which the display case 2 is opened with respect to the main body case 3 while the display surface of the display panel 5 is directed to the subject, and this state is suitable for self imaging (self photographing) or self-timer imaging (self-timer photographing) because the subject can be captured while checking the display surface from the side of the subject.

This state assumes self imaging and thus, in consideration of ease of use for that purpose, the subject is displayed in the display panel as an image like a self image in a mirror. Therefore, in this state, the camera performs control so that an image is displayed by being inverted left and right with respect to the normal imaging state.

Figure 3:
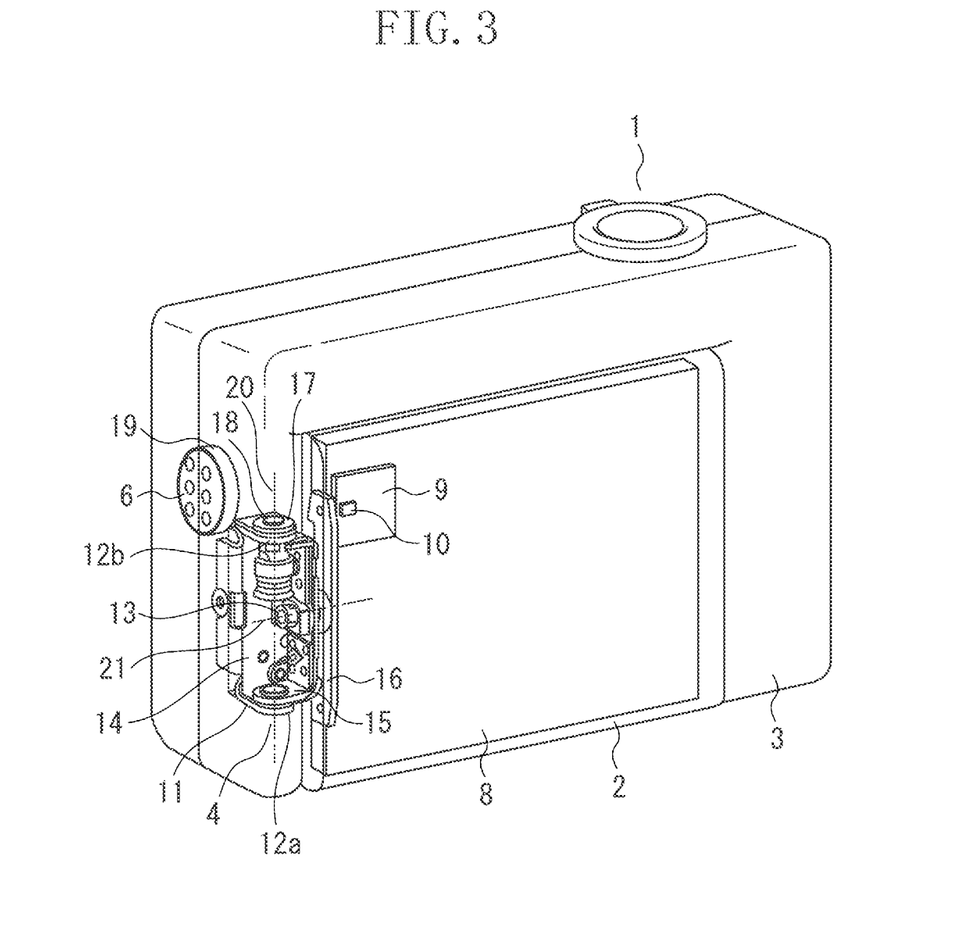
FIG. 3 is a diagram illustrating an internal structure of a hinge of the imaging apparatus according to an exemplary embodiment of the present invention.

Next, the method of detecting the four states of the display case 2 illustrated in FIGS. 2A, 2B, 2C, and 2D will be described. First, the internal structure of the hinge 4 will be described. FIG. 3 is a perspective view illustrating the internal structure of the hinge 4 of the digital camera 1. Incidentally, the state illustrated in FIG. 3 corresponds to the state illustrated in FIG. 2B.

A display panel unit 8 as an image display unit and a display circuit board 9 are arranged inside the display case 2. A rotation detection magnetic sensor 10 to detect a rotation operation of the hinge 4, that is, the rotation state of the display case 2 with respect to the main body case 3 is mounted on the display circuit board 9. The display circuit board 9 is fixed to the rear surface of the display panel unit 8.

A hinge unit 11 is arranged inside the hinge 4 to connect the display case 2 and the main body case 3. The hinge unit 11 is a biaxial hinge mechanism that supports the display case 2 openably/closably and rotatably with respect to the main body case 3, and has first axis portions 12a, 12b for opening/closing and a second axis portion 13 for rotating the display case 2.

A first axis 20 for opening/closing and a second axis 21 for rotation are orthogonal to each other. The first axis portion 12a and the second axis portion 13 have a hollow structure to allow a wire harness (not illustrated) to pass for electrically connecting the display case 2 and the main body case 3.

The hinge unit 11 includes a hinge base plate 14, a hinge opening/closing plate 15, and a hinge rotation plate 16. The hinge base plate 14 is fixed to the main body case 3, and the hinge opening/closing plate 15 is rotatably connected to the hinge base plate 14 by the opening/closing axis portions 12a, 12b.

Further, the hinge rotation plate 16 is rotatably connected to the hinge opening/closing plate 15 by the second axis portion 13 and fixed to the display case 2. With the configuration of the hinge unit 11 described above, the display case 2 is openably/closably and rotatably connected to the main body case 3.

Also, a hinge circuit board 17 is arranged in the hinge unit 11 on the upper part of the first axis portion 12b to intersect the first axis 20. The hinge circuit board 17 has an opening/closing detection magnetic sensor 18 to detect an opening/closing operation of the hinge 4, that is, an open/closed state of the display case 2 with respect to the main body case 3 mounted on the first axis 20.

The hinge circuit board 17 is fixed to the hinge opening/closing plate 15 directly or via a component, and moves rotationally around the first axis 20 as the rotation center while relatively fixed to the hinge opening/closing plate 15 during opening/closing operation of the display case 2. In the present exemplary embodiment, the opening/closing detection magnetic sensor 18 is arranged in a position to match the first axis 20, but may be positioned near the first axis 20.

The speaker 19 is arranged near the first axis portion 12b of the hinge unit 11 inside the main body case 3 with a sounding surface directed toward the sound holes 6 on the side face of the main body. The speaker 19 has a magnet inside, and is a type of speaker that produces sound by driving a diaphragm by a coil and the magnet.

Next, the method of detecting the open/closed state and the rotation state of the display case 2 with respect to the main body case 3 by the opening/closing detection magnetic sensor 18 (first magnetic detection sensor) and the rotation detection magnetic sensor 10 (second magnetic detection sensor) will be described.

Figure 4A:
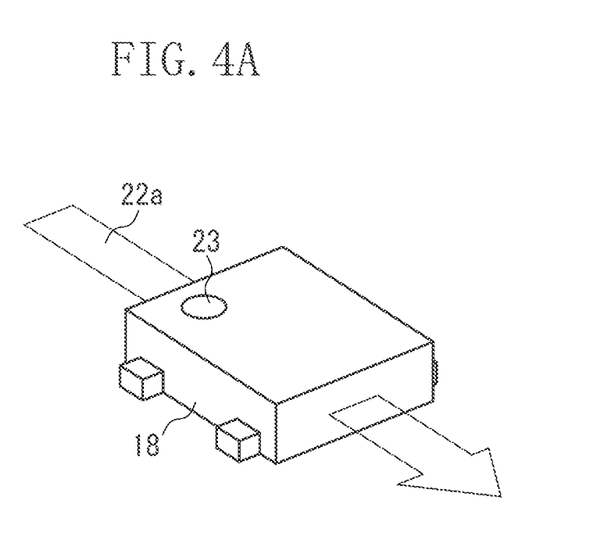
FIGS. 4A and 4B are diagrams each illustrating a magnetic sensor for opening/closing detection and a direction of a magnetic field detected by the magnetic sensor for rotation detection.
Figure 4B:
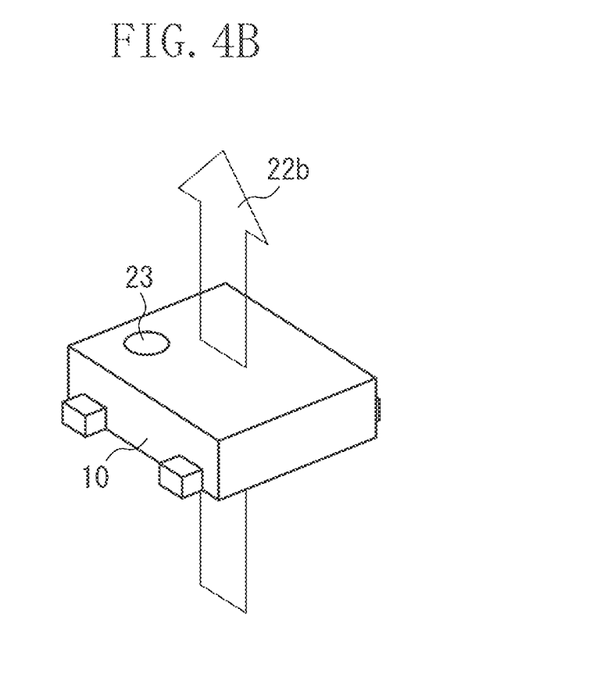

FIGS. 4A and 4B are diagrams illustrating the direction of the magnetic field to be detected by the opening/closing detection magnetic sensor 18 and the rotation detection magnetic sensor 10. FIG. 4A illustrates a direction 22a of the magnetic field that can be detected by the opening/closing detection magnetic sensor 18, and the FIG. 4B illustrates a direction 22b of the magnetic field that can be detected by the rotation detection magnetic sensor 10. A 1-pin mark 23 is marked on the element.

As seen from FIGS. 4A and 4B, the magnetic field detected by the opening/closing detection magnetic sensor 18 and the rotation detection magnetic sensor 10 can detect only the magnetic field of the respective given direction.

As illustrated in FIG. 4A, the direction of the magnetic field detected by the opening/closing detection magnetic sensor 18 is substantially parallel to the mounted board surface and perpendicular to between electrodes opposing the component and in the direction from the 1-pin mark. In other words, the direction of the magnetic field to be detected by the opening/closing detection magnetic sensor 18 is a direction substantially perpendicular to the first axis 20.

As illustrated in FIG. 4B, the direction of the magnetic field detected by the rotation detection magnetic sensor 10 is substantially perpendicular to the mounted board surface and in the direction from the rear side of the component to the front side. In other words, the direction of the magnetic field detected by the rotation detection magnetic sensor 10 is a direction substantially perpendicular to the second axis 21.

Each magnetic sensor to detect a magnetic field outputs a signal whose voltage level is a LOW level for a magnetic field whose magnetic flux density exceeds a predetermined magnetic flux density and a signal whose voltage level is a HIGH level for a magnetic field whose magnetic flux density is equal to or less than the predetermined magnetic flux density. The digital camera 1 reads an output signal level, which is a detection result of each magnetic sensor, by a CPU (not illustrated) to determine the open/closed state and the rotation state of the display case 2 with respect to the main body case 3.

Figure 5A:
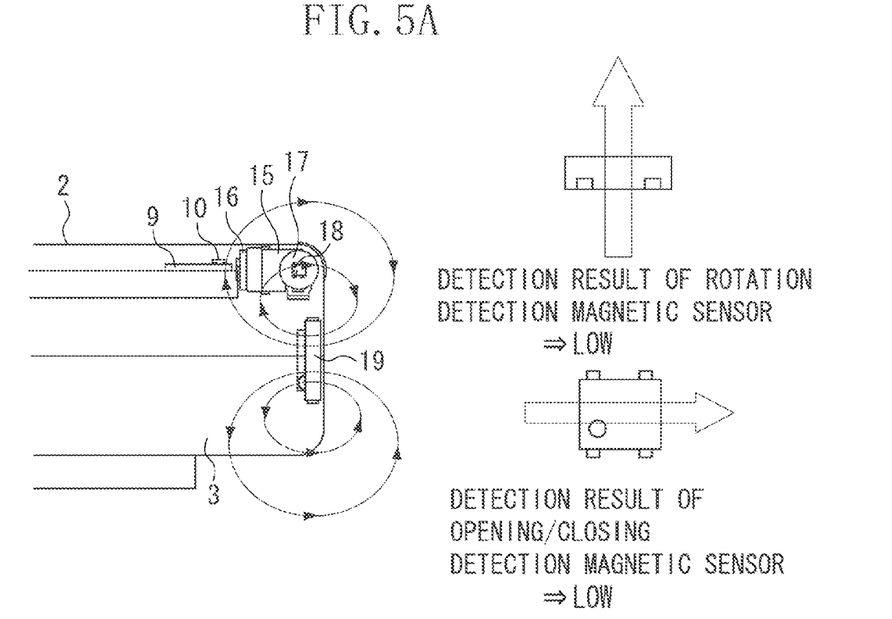
FIGS. 5A to 5C are diagrams each illustrating a relative spatial relationship of the direction of a line of magnetic force generated by a speaker of the imaging apparatus with respect to an opening/closing detection magnetic sensor and rotation detection magnetic sensor according to an exemplary embodiment of the present invention.
Figure 5B:
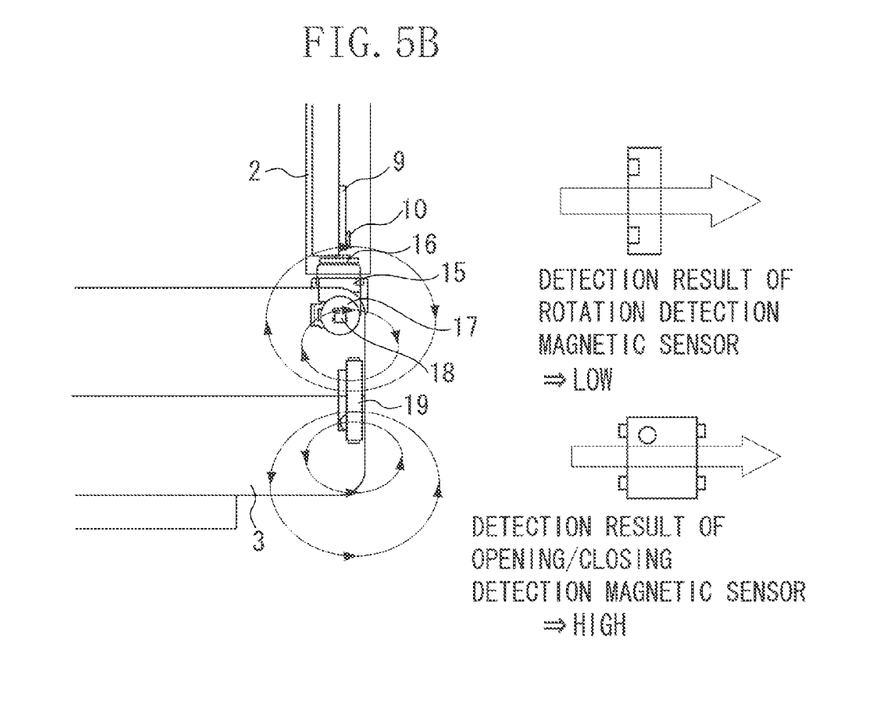
Figure 5C:
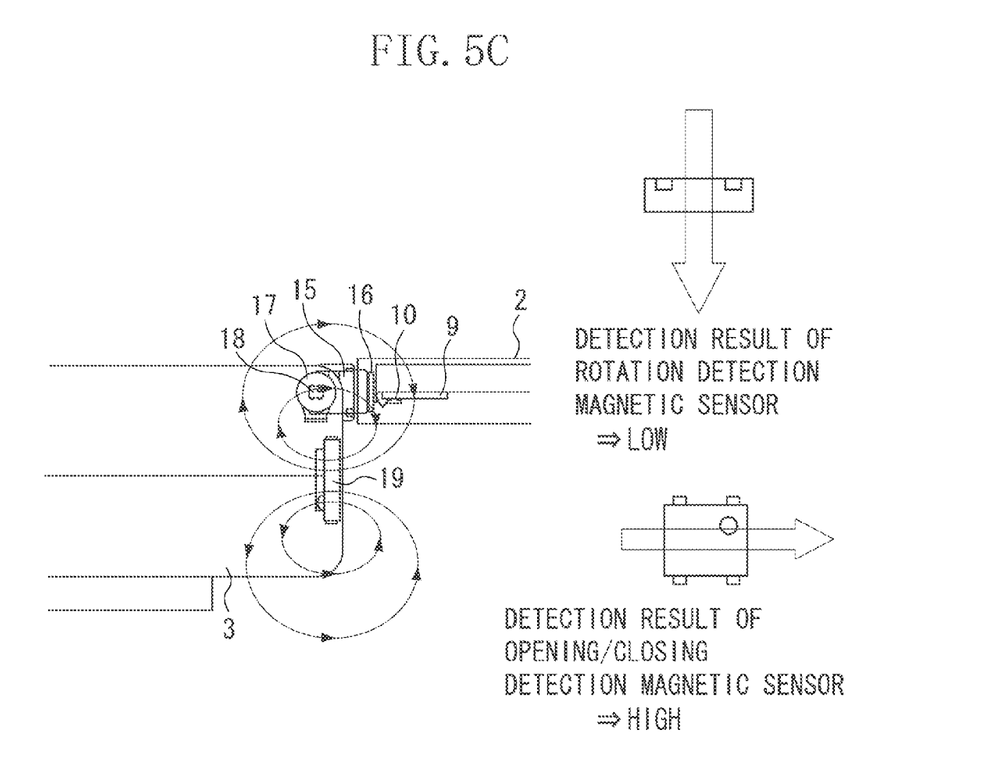

FIGS. 5A, 5B, and 5C are perspective views viewed from the top surface of the digital camera 1 illustrating the relative spatial relationship of the direction of the line of magnetic force generated by the speaker 19, relative to the opening/closing detection magnetic sensor 18 and the rotation detection magnetic sensor 10 during opening/closing operation of the display case 2.

The opening/closing detection magnetic sensor 18 and the rotation detection magnetic sensor 10 are arranged on a plane substantially perpendicular to the first axis 20 and passing through a substantial center of the speaker 19, and the line of magnetic force from the speaker 19 illustrated in FIGS. 5A and 5C indicates a line of magnetic force on this plane. Additionally in FIGS. 5A to 5C, magnetic detection states of the opening/closing detection magnetic sensor 18 and the rotation detection magnetic sensor 10 in each state of the display case 2 are illustrated.

FIG. 5A illustrates a containing state in which the display case 2 is closed to the side of the main body case 3 while the display surface of the display panel 5 being directed to the inner side. The relative spatial relationship of the line of magnetic force from the speaker 19 with respect to the opening/closing detection magnetic sensor 18 and the rotation detection magnetic sensor 10 in this state is illustrated in FIG. 5A, and the line of magnetic force from the speaker 19 is in a direction that can be detected by both the opening/closing detection magnetic sensor 18 and the rotation detection magnetic sensor 10. Accordingly, each magnetic sensor outputs a signal of LOW level.

FIG. 5B illustrates a state in which the display case 2 is opened by 90 degrees (opening angle: 90 degrees) from the containing state. In this state, the opening/closing detection magnetic sensor 18 is in a rotated state of 90 degrees on the first axis due to rotational movement accompanying an opening/closing operation of the display case 2, and the angle at which the line of magnetic force from the speaker 19 is intersected changes so that the magnetic field generated by the speaker 19 can no longer be detected by the opening/closing detection magnetic sensor 18.

On the other hand, the rotation detection magnetic sensor 10 is in a position rotated by 90 degrees around the first axis together with the display case 2, but the angle at which the line of magnetic force from the speaker 19 is intersected is unchanged from the angle in a containing imaging state and therefore, the magnetic field can be detected similarly. Accordingly, the opening/closing detection magnetic sensor 18 outputs a signal of HIGH level, and the rotation detection magnetic sensor 10 outputs a signal of LOW level.

FIG. 5C illustrates a state in which the display case 2 is in a state in which the display case 2 is opened by 180 degrees with respect to the containing state by further rotating thereof by 90 degrees from the state of FIG. 5B (opening angle: 180 degrees). This state corresponds to the state illustrated in FIG. 2C in which the display case 2 is opened and the display surface thereof is directed to the photographer.

In this state, the opening/closing detection magnetic sensor 18 is in a rotated state of 180 degrees on the first axis 20, and remains unable to detect the magnetic field generated by the speaker 19.

On the other hand, the rotation detection magnetic sensor 10 is in a position further rotated by 90 degrees around the first axis 20 together with the display case 2, but also in this state, the angle at which the line of magnetic force from the speaker 19 is intersected is unchanged from the angle in a containing state, and therefore, the magnetic field can be detected similarly. That is, like in FIG. 5B, the opening/closing detection magnetic sensor 18 outputs a signal of HIGH level and the rotation detection magnetic sensor 10 outputs a signal of LOW level.

The detection operation of each magnetic sensor during opening/closing operation of the display case 2 has been described above. As described above, detection of the closed state and other states is enabled by the opening/closing detection magnetic sensor 18 being changed to between a state capable of detecting the line of magnetic force from the speaker 19 and a state not capable of detecting the line of magnetic force from the speaker 19 accompanying the opening/closing operation of the display case 2.

On the other hand, the angle at which the rotation detection magnetic sensor 10 and the line of magnetic force by the speaker 19 intersect remains unchanged in the meantime, and the detection result of the rotation detection magnetic sensor 10 does not change.

Figure 6:
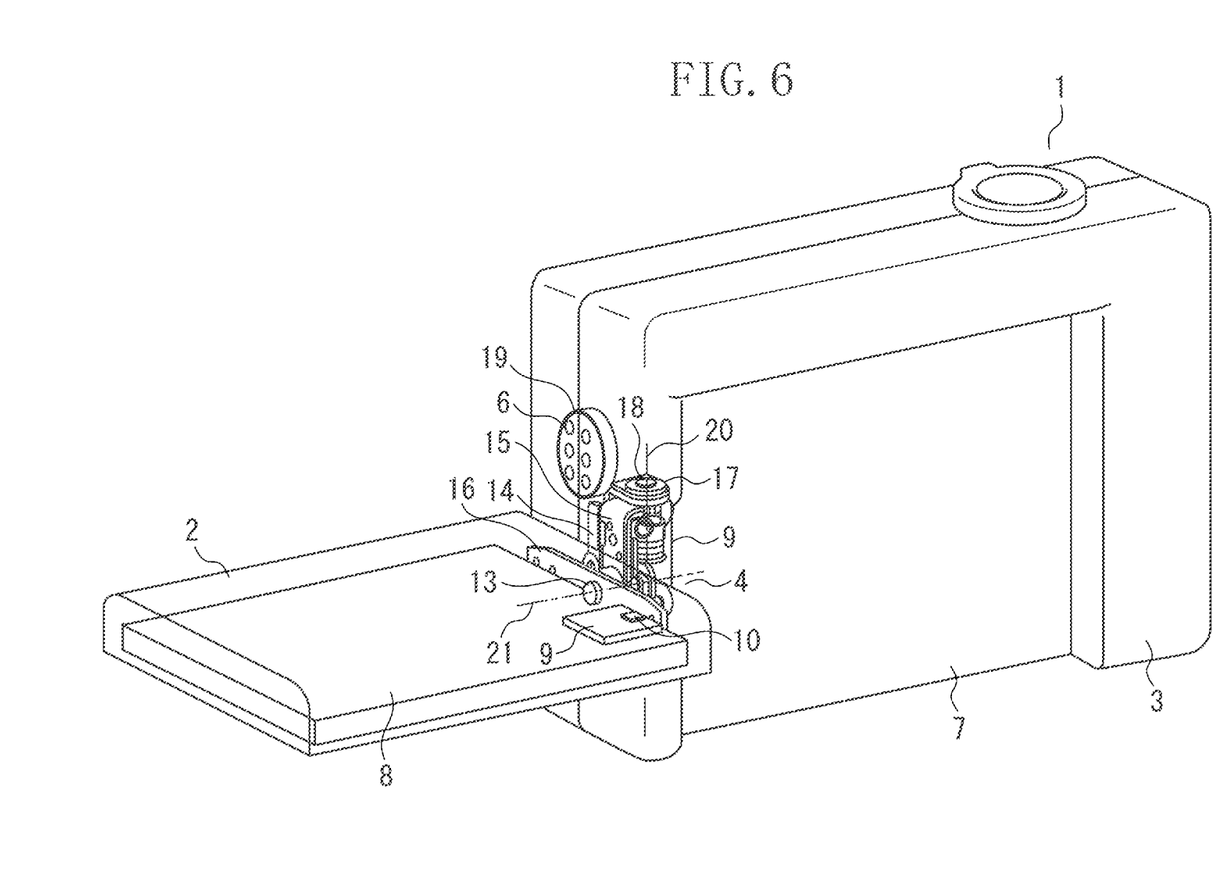
FIG. 6 is a diagram illustrating an internal structure of the hinge when the display case of the imaging apparatus is opened by 180 degrees with respect to a main body case and rotated by 90 degrees so that a display surface thereof is directed downward according to an exemplary embodiment of the present invention.

Next, detection of the rotation operation of the display case 2 will be described. FIG. 6 is a perspective view illustrating an internal structure of the hinge 4 when the display case 2 is rotated by 90 degrees (rotation angle: −90 degrees) around the second axis 21 as the rotation center from the state illustrated in FIG. 2C so that the display surface is directed downward.

The rotation detection magnetic sensor 10 can detect the magnetic field from the speaker 19, from the containing state to the state illustrated in FIG. 2C. In the state illustrated in FIG. 6, on the other hand, the rotation detection magnetic sensor 10 is moved away from the speaker 19 by the display case 2 being rotated, and the magnetic flux density in the position of the rotation detection magnetic sensor 10 falls short of a predetermined magnetic flux density.

FIG. 6 illustrates a state in which the opening angle of the display case 2 with respect to the main body case 3 is 90 degrees, but this applies regardless of the opening angle of the display case 2. In other words, the rotation detection magnetic sensor 10 outputs a signal of LOW level, which is a magnetic field detection state, from the containing state to the state illustrated in FIG. 2C, but outputs a signal of HIGH level, which is a magnetic field non-detection state, in a state in which the display case 2 is rotated therefrom.

As described above, the rotation state of the display case 2 can be detected by the rotation detection magnetic sensor 10 regardless of the open/closed state of the display case 2.

In the foregoing, the methods of determining the open/closed state and the rotation state of the display case 2 with respect to the main body case 3 by the digital camera 1 have been described. Combinations of signal outputs of the opening/closing detection magnetic sensor 18 and the rotation detection magnetic sensor 10 can be summarized as illustrated in FIG. 7.

Figure 7:
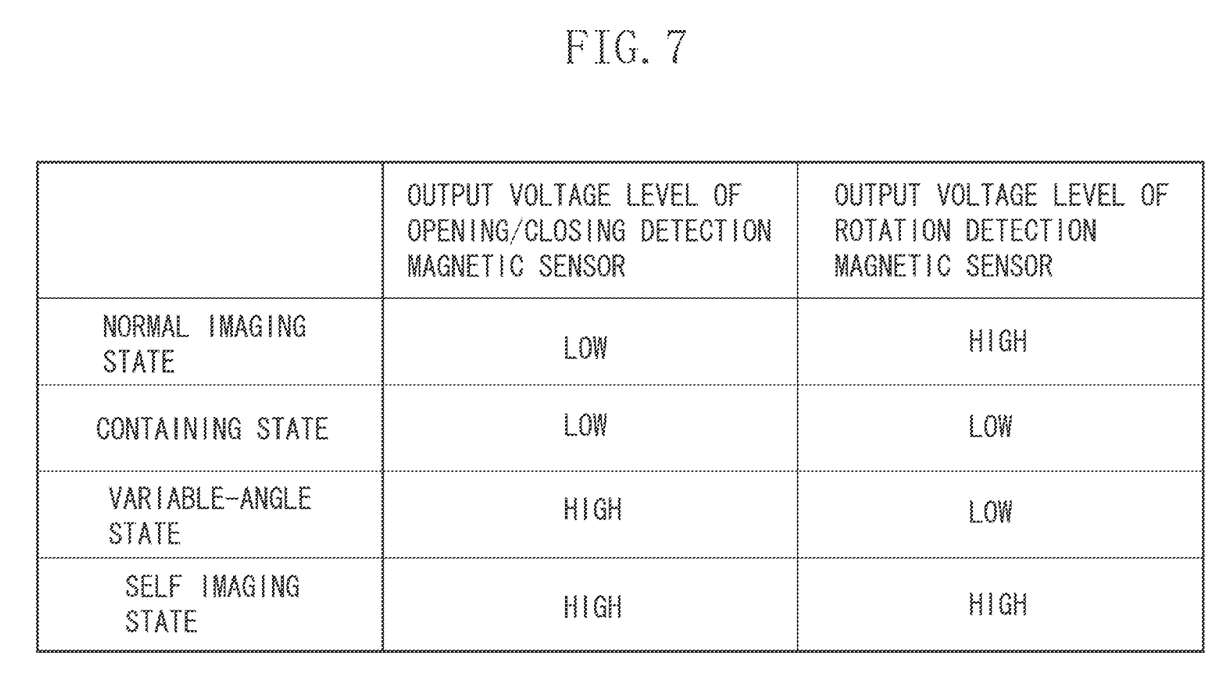
FIG. 7 is a diagram illustrating an output signal of the opening/closing detection magnetic sensor and rotation detection magnetic sensor depending on the state of the display case of the imaging apparatus according to an exemplary embodiment of the present invention.

As illustrated in FIG. 7, the opening/closing detection magnetic sensor 18 has different detection results to be output depending on the opening/closing operation of the display case 2 with respect to the main body case 3, but has detection results to be output that do not change for the rotation operation of the display case 2 with respect to the main body case 3. On the other hand, the rotation detection magnetic sensor 10 has detection results to be output that do not change for the opening/closing operation of the display case 2 with respect to the main body case 3, but has different detection results to be output according to the rotation operation of the display case 2 with respect to the main body case 3.

By combining the signal output of each sensor illustrated in FIG. 7, the CPU (not illustrated) of the digital camera 1 can determine four usage states based on the open/closed state and the rotation state of the display case 2 with respect to the main body case 3. Then, the CPU can perform control of the image display to the display panel 5 appropriately according to the determined state of the display case 2.

As described above, there is no need to arrange a detection switch or sensor in the hinge and therefore, the diameter of the hinge can be reduced. Also, there is no need to arrange a board for the detection switch or sensor inside the hinge, and there is no need to solder a portion of lead wire of a wire harness to pass through a hinge for electric connection and therefore, the processing of the wire harness is simplified and the cost can be suppressed. Moreover, there is no concern about poor soldering and reliability can be improved.

A dedicated magnet may be provided instead of a speaker as a magnetic field generating member used for opening/closing detection and rotation detection. However, by using a speaker as a magnetic field generating member used for opening/closing detection and rotation detection, the need to specifically provide a dedicated magnet for magnetic field detection can be eliminated by using only two magnetic field sensors. Therefore, the cost can be suppressed, and also the need of space to arrange the dedicated magnet can be eliminated.

In the foregoing, exemplary embodiments of the present invention have been described, but the present invention is not limited to these exemplary embodiments and various alterations and modifications can be made within the scope and spirit thereof. For example, the present invention can be applied to any electronic device other than the digital camera such as a mobile phone if the electronic device has a main body of the device and a movable portion connected in such a way that the movable portion can rotate around a first axis as the rotation center and around a second axis as the rotation center with respect to the main body of the device.

The magnetic field generating member is not limited to the speaker, and may be another member that can be arranged near the hinge inside the main body case and generates a magnetic field.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-251897 filed Nov. 10, 2010, which is hereby incorporated by reference herein in its entirety.

What is claimed is:

1. An electronic device, comprising:
   a main body;
   a movable unit connected to the main body and rotatable around a first axis as a rotation center with respect to the main body;
   a magnetic field generating member provided in the main body; and
   a magnetic field detection sensor arranged in a position on a straight line parallel with the first axis and extending on the first axis,
   wherein in a case that the movable unit is rotated around the first axis as the rotation center with respect to the main body, a direction of a magnetic field that can be detected by the magnetic field detection sensor changes and an output signal of the magnetic field detection sensor changes.

2. The electronic device according to claim 1, wherein the first axis is substantially parallel to an end of the movable unit connected to the main body.

3. The electronic device according to claim 1, wherein the magnetic field detection sensor detects the magnetic field in the direction substantially perpendicular to the first axis.

4. The electronic device according to claim 3, wherein the magnetic field detection sensor detects the magnetic field in the direction substantially perpendicular to the first axis regardless of a rotation state of the movable unit around the first axis as the rotation center.

5. The electronic device according to claim 1, wherein the magnetic field detection sensor is provided in the main body.

6. The electronic device according to claim 1, wherein in the case that the movable unit is rotated around the first axis as the rotation center with respect to the main body, a position of the magnetic field detection sensor with respect to the magnetic field generating member does not change.

7. The electronic device according to claim 1, wherein the magnetic field generating member is arranged near the magnetic field detection sensor.

8. The electronic device according to claim 7, wherein the magnetic field generating member is a speaker.

9. The electronic device according to claim 1, further comprising a control unit configured to perform control according to a rotation state of the movable unit around the first axis as the rotation center.

10. The electronic device according to claim 9, further comprising:
    a display unit provided in the movable unit to display an image,
    wherein the control unit performs display control of the display unit according to the rotation state of the movable unit around the first axis as the rotation center.

11. The electronic device according to claim 1,
wherein the movable unit is connected to the main body and is capable of rotating around a second axis, which is perpendicular to the first axis, as the rotation center with respect to the main body, and
wherein in a case that the movable unit is rotated around the second axis as the rotation center with respect to the main body, the magnetic field detection sensor does not rotate.

12. The electronic device according to claim 11, further comprising a second magnetic field detection sensor provided in the movable unit,
wherein in the case that the movable unit is rotated around the first axis as the rotation center with respect to the main body, a position of the second magnetic field detection sensor with respect to the magnetic field generating member changes.

13. The electronic device according to claim 11, wherein the magnetic field detection sensor detects the magnetic field in the direction substantially parallel to the second axis.

14. The electronic device according to claim 11, wherein the magnetic field detection sensor detects the magnetic field in the direction substantially parallel to the second axis regardless of a rotation state of the movable unit around the first axis as the rotation center.

\* \* \* \* \*